United States Patent Office 3,366,810
Patented Jan. 30, 1968

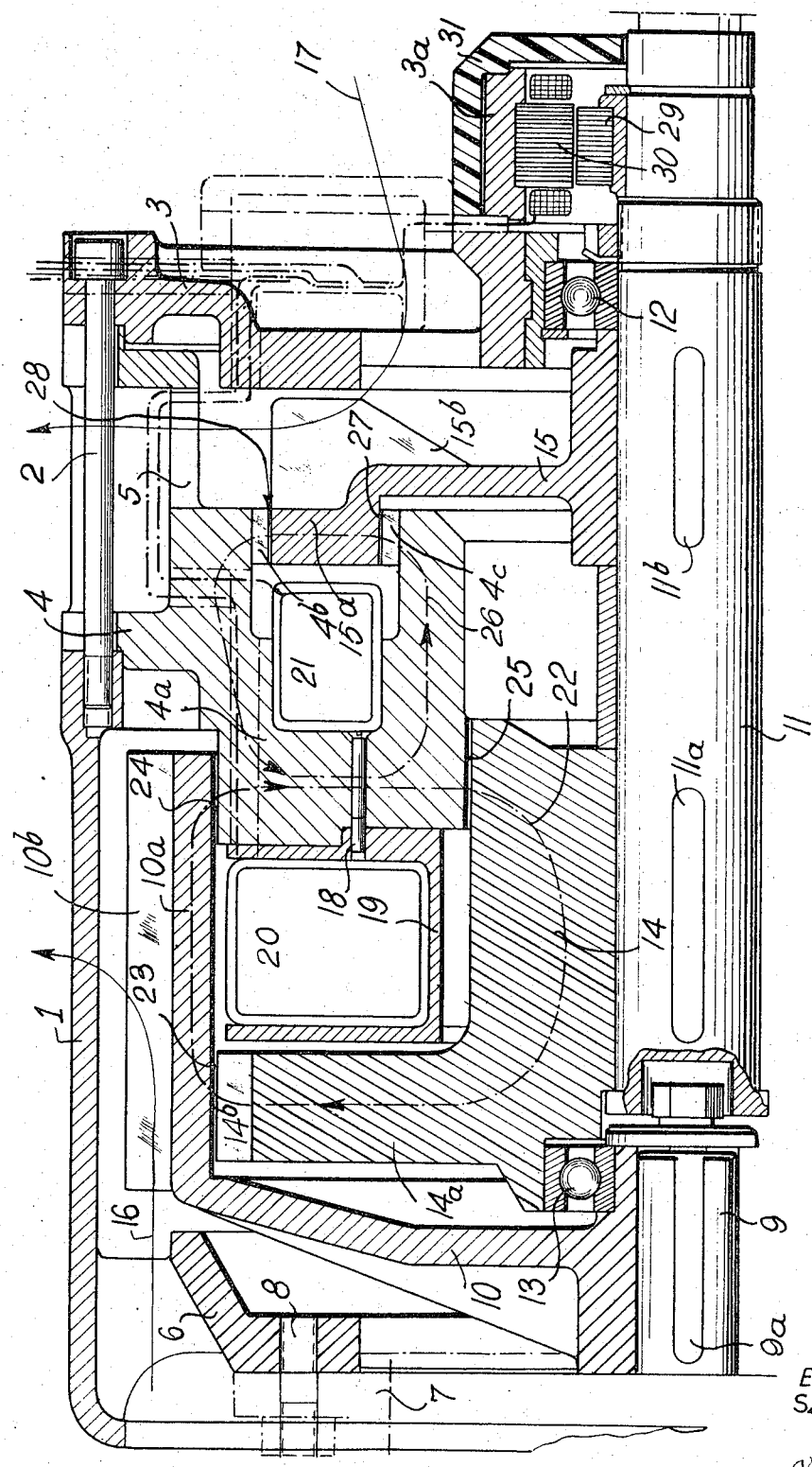

3,366,810
EDDY-CURRENT COUPLINGS AND BRAKES
Elie Cohen, 89 Rue Bobillot, Paris, 13eme, France, and Szymon Roth, 18 Blvd. Barbes, Paris, 18eme, France
Filed May 21, 1964, Ser. No. 369,118
Claims priority, application France, May 21, 1963, 935,527, Patent 1,368,166
13 Claims. (Cl. 310—96)

ABSTRACT OF THE DISCLOSURE

An eddy-current coupling in which a clutch rotor on a driving shaft is coaxially nested with the stator and, on one side of the stator, a clutch rotor of the driven shaft while a brake rotor is axially spaced from the clutch rotor on the driven shaft by the stator and is coaxially nested therewith, excitation coils being provided on the opposite sides of the stator and being enclosed respectively by the clutch rotors and the stator and by the brake rotor and the stator.

---

This invention relates to improvements in eddy-current couplings and brakes.

In general, in combined eddy-current couplings (clutches) and brakes, the brake should meet the following requirements:

(a) It should provide an adequate braking torque, normally of the same order of magnitude as the torque transmitted by the driving coupling.

(b) It should not introduce any substantial additional inertia.

(c) It should be simple.

It is an object of this invention to provide an eddy-current coupling having a stator mounted within, and supported by, a casing and having first and second portions, the coupling including a driving coupling comprising a first electrically energizable excitation coil secured to the first stator portion, a driving shaft supported by the casing, a first rotor mounted on said driving shaft, a driven shaft supported by said first rotor and said casing, and a second rotor mounted on the driven shaft; and a braking coupling comprising a second electrically energizable excitation coil secured to the second stator portion, and a third rotor mounted on said driven shaft. The first rotor surrounds the second rotor, the first stator portion and the first excitation coil so as to be traversed by a magnetic field set up by the first excitation coil upon energization thereof, and the third rotor lies adjacent the second stator portion so as to be traversed by a magnetic field set up by the second excitation coil upon energization thereof.

Some features of the invention are the manner in which the three rotors and the stator interlock; the fact that part of the magnetic stator is common to the lines of force produced in both the driving coupling and the brake; the independent cooling arrangements for both the driving coupling and the brake; and the paths taken by the lines of magnetic force in various parts of the coupling.

One embodiment of the invention will now be described, by way example, with reference to the accompanying drawing, in which the sole figure is an axial section of an eddy-current coupling and brake according to this invention.

Referring now to the drawing an outer casing 1 is rigidly attached by bolts 2 to an end plate 3, and to a magnetic stator 4, this stator being clamped between the casing and the end plate.

Ridges and grooves are provided for centering the casing 1, the end plate 3 and the stator 4. The periphery of the stator has a plurality of openings 5, which, as will be seen later, provide a radial path for the cooling air.

At the end remote from the end plate 3 is a flanged plate 6 of a driving motor 7, this plate being attached to the casing by bolts 8.

A driving shaft 9 of the coupling is coup'ed to a primary rotor 10 of the eddy-current coupling by means of key 9a, and is driven at constant speed by a driving motor (not shown).

The cylindrical part 10a of this rotor is made of a magnet steel and has a smooth inner face, the outer face carrying cooling fins 10b which as the same time act as centrifugal-fan blades. The axial length of the primary rotor 10a is such that this rotor covers at least part of the central portion, 4a, of the stator 4.

An output shaft 11 of the coupling is supported at one end by bearing 12, mounted in axial alignment with the end plate 3, and at the other end by bearing 13, carried by the inner end of driving shaft 9.

A secondary coupling rotor 14 and a brake rotor 15 are locked to shaft 11 by means of keys 11a and 11b respectively.

The secondary coupling 14 has an extension rim 14a terminating at its outer periphery in a succession of teeth and slots, 14b, which face the inner periphery 10 of the primary rotor 10a. The brake rotor 15, on the other hand, terminates in an annular rim 15a made of a magnet steel, the two smooth cylindrical surfaces of which each face a succession of teeth and slots, 4b and 4c, in the right-hand portion of the magnetic mass of the stator 4. The brake rotor also carries cooling fins 15b which, in addition act as radial fan blades. It will be seen therefore, that the paths of the cooling air, 16 and 17, cooling the coupling side and the braking side respectively, are independent of each other.

It should be noted that as only rim 15a needs to be made of a magnet steel, the hub of the brake rotor could be of any metal.

The stator and the various rotors are of such cross-sections that the components fit into one another in a special manner, this interlocking design serving the purpose of creating the two magnetic circuits concerned with the coupling and braking sides, respectively.

For this purpose, it will be seen that the central portion 4a of the stator has attached to it, by bolts 18, a cage 19 of non-magnetic metal for housing an exciter coil 20 of the coupling. Similarly, brake exciter coil 21 is mounted in a special housing in the stator.

The magnetic circuit of the coupling side, one of the lines of force of which is numbered 22, traverses, in succession, one active air gap, 23, and two inactive air gaps, 24 and 25. This circuit is thus closed by the following parts: central portion 4a of the stator, gap 25, the axial portion 14 of the rotor, rim 14a teeth and slots 14b, active gap 23, primary rotor 10a and gap 24.

On the brake side, the magnetic circuit, one of the lines of force of which is numbered 26, is made up of the common central portion of the stator, the inner periphery of the stator, teeth and slots 4c, a first active air gap 27, magnetic rim 15a, a second active air gap 28, teeth and slots 4b and the outer periphery of the stator. The teeth and slots 4b or 4c are so arranged as to set up a homopolar field, the teeth and slots at the top having the same polarity as the opposite teeth and slots at the bottom.

It will be noted that the lines of force of the magnetic circuit 22 are opposite in direction to those of the magnetic circuit 26, so that the central portion 4a of the stator, which is common to both the coupling and the brake sides, is transversed by a magnetic flux in the same direction and the active air gaps in the opposite direction so as to facilitate the dissipation of residual flux during switching periods.

To enable the speed of rotation to be measured, provision is made, along the axis of the end plate 3 and alongside bearing 13, for a tachometric alternator or dynamo having a rotor 29 and a stator 30. A protective cover 31 is screwed on to the threaded end 3a of the plate 3.

The mode of operation of the coupling described above is as follows:

During normal running, with the coupling functioning as an eddy-current coupling, only coil 20 is energized namely, with direct current. The magnetic flux produced is as shown by the line of force 22. Eddy-currents are induced in the cylindrical portion 10a of the primary rotor opposite teeth and slots 14b of secondary rotor 14. Under the action of these eddy-currents and the magnetic field, an electro-magnetic moment is set up which accelerates rotor 14 and its shaft 11. The speed of the output shaft is controlled by regulation of the current energizing the coil 20.

When it is desired to brake the coupling, the current is cut-off from the coil 20 and the brake coil, 21, is energised. The magnetic field produced by this coil is as indicated by the line of force 26, which, as already stated, passes across the two active air gaps 27 and 28. It is a feature of the eddy-current coupling according to this invention that the magnetic flux traverses two active air gaps, both on the same side of the coil 21. In this way, eddy-currents are set up simultaneously in both of the smooth active faces of the rim 15a, so that the braking torque obtained is twice as great as would exist in an arrangement such as that on the driving side of the eddy-current coupling. The braking effect is controlled by regulation of the current energizing coil 21.

The electrical connections to the coil and to the tachometric alternator are shown in dot-dash lines.

What we claim is:

1. An eddy-current coupling comprising:
   a casing;
   a diriving shaft extending into said casing at one end thereof;
   a driven shaft in said casing coaxial with said driving shaft;
   an annular stator coaxially surrounding said driven shaft and mounted in said casing;
   an annular first rotor mounted on said driving shaft and having an annular portion axially nested with said stator;
   an annular second rotor mounted on said driven shaft and axially nested with both said stator and said first rotor to define therewith an eddy-current driving coupling adapted to sustain a magnetic flux;
   a first electrically energizable excitation coil mounted on said stator and enclosed by said stator and said first and second rotors for generating said magnetic flux;
   an annular third rotor axially spaced from said first rotor and separated therefrom by said stator while being mounted on said driven shaft and forming an eddy-current brake with said stator, said third rotor being axially nested with said stator; and
   a second electrically energizable excitation coil mounted on said stator and enclosed by said stator and said third rotor for generating a magnetic flux through said stator and said third rotor.

2. An eddy-current coupling comprising:
   a casing;
   a stator mounted within, and supported by, said casing and having first and second portions;
   a driving coupling including a first electrically energizable excitation coil secured to said first portion of said stator, a driving shaft supported by said casing, a first rotor mounted on said driving shaft, a driven shaft supported by said first rotor and said casing, and a second rotor mounted on said driven shaft; and
   a braking coupling including a second electrically energizable excitation coil secured to said second portion of said stator, and
   a third rotor mounted on said driven shaft, said first rotor surrounding said second rotor, said first stator portion and said first excitation coil so as to be traversed by a magnetic field set up by the first excitation coil upon energization thereof, said third rotor lying adjacent said second portion of said stator so as to be traversed by a magnetic field set up by said second excitation coil upon energization thereof, said stator having a central portion between said first and second portions thereof, said central portion being traversed by said magnetic fields set up by said first and second excitation coils,
   said first portion of the stator having a smooth outer peripheral surface and a smooth inner peripheral surface, said first rotor having a smooth inner peripheral surface, said second rotor comprising
   a first part surrounded by said first rotor, and
   a second part surrounded by said first portion of the stator, said second part having a smooth outer peripheral surface defining an annular gap between the first rotor and said first part of the stator and between the second part of the second rotor and said first part of the stator.

3. An eddy-current coupling according to claim 2, further comprising
   a plurality of teeth upstanding from said first part and facing towards said smooth inner peripheral surface of the first rotor.

4. An eddy-current coupling according to claim 2, further comprising
   a plurality of cooling fins upstanding from the outer peripheral surface of said first rotor.

5. An eddy-current coupling according to claim 4, further comprising
   a plurality of cooling fins upstanding from the outer radial surface of said third rotor.

6. An eddy-current coupling according to claim 2 wherein said stator forms an annular recess and said third rotor has an annular part lying within said recess, the outer and inner peripheries of said part of said third rotor part being smooth, said second portion of said stator comprising
   two radially spaced cylindrical surfaces each having a plurality of teeth thereon extending respectively towards the outer and inner peripheries of said third rotor part within said recess.

7. An eddy-current coupling according to claim 6, wherein adjacent teeth on each of said cylindrical surfaces of the third rotor part are opposite in polarity, opposite teeth on said cylindrical surfaces confronting said inner and outer peripheries being of the same polarity.

8. An eddy-current coupling according to claim 7, wherein said second excitation coil is mounted between said first and second stator portions.

9. An eddy-current coupling comprising:
   a casing;
   a stator mounted within, and supported by, said casing and having first and second portions;
   a driving coupling including a first energizable excitation coil secured to said first portion of said stator, a driving shaft supported by said casing, a first rotor mounted on said driving shaft and having an annular portion with a smooth inner periphery, a driven shaft supported by said first rotor and said casing, and a second rotor mounted on said driven shaft, said second rotor having a cylindrical outer surface with a plurality of teeth upstanding therefrom and facing toward said inner periphery of the first rotor;
   a braking coupling comprising a second energizable excitation coil secured to said second portion of said stator, and a third rotor mounted on said driven shaft, said annular portion of the first rotor surrounding said second rotor, said first portion of said stator and said excitation coil so as to be traversed by a magnetic field set up by the first excitation coil upon energization thereof, said third rotor lying adjacent said second stator portion so as to be traversed by a magnetic field set up by said second excitation coil upon energization thereof, said second rotor having a further cylindrical outer surface having a smooth periphery, and said first portion of the stator having a smooth outer peripheral surface adjacent the inner surface of the first rotor and a smooth inner peripheral surface adjacent the said further cylindrical outer of the of the second rotor.

10. An eddy-current coupling according to claim 9, wherein said second portion of said stator defines an annular recess and said third rotor comprises a radial portion secured to said driven shaft and
an annular portion extending from said radial portion and lying within said recess, said annular portion having
a plurality of teeth extending towards the outer and inner cylindrical walls of said second stator portion defining the recess.

11. An eddy-current coupling according to claim 10, wherein said first excitation coil is wound so as to produce a magnetic field having lines of force which traverse the gap between said inner periphery of the first rotor and the toothed surface of the second rotor in one direction, and said second excitation coil is wound so as to produce a magnetic field having lines of force which also traverse in said one direction the gap between said annular portion of the third rotor and the said walls of the stator defining the recess therein.

12. An eddy-current coupling according to claim 11, comprising
a tachometric alternator secured to said driven shaft.

13. An eddy-current coupling according to claim 11, comprising,
a tachometric dynamo secured to said driven shaft.

References Cited
UNITED STATES PATENTS

| | | | |
|---|---|---|---|
| 2,343,291 | 3/1944 | Gilfillan et al. | 310—99 |
| 2,885,578 | 5/1959 | Gilfillan et al | 310—96 |

DAVID X. SLINEY, *Primary Examiner.*